United States Patent

Muri et al.

[11] Patent Number: 5,881,112
[45] Date of Patent: Mar. 9, 1999

[54] MODULATOR WITH BASEBAND TO PHASE CONVERTER

[75] Inventors: David L. Muri, Sunrise; Charles A. Backof, Jr., Coral Springs, both of Fla.

[73] Assignee: Motorola, Inc., Schaumburg, Ill.

[21] Appl. No.: 551,970

[22] Filed: Nov. 2, 1995

[51] Int. Cl.⁶ ..................................................... H04L 27/22
[52] U.S. Cl. .......................... 375/332; 375/316; 455/337
[58] Field of Search .................................. 375/332, 316, 375/324, 340; 455/324, 337; 329/327

[56] References Cited

U.S. PATENT DOCUMENTS

| | | | |
|---|---|---|---|
| 4,653,117 | 3/1987 | Heck | 455/209 |
| 5,095,536 | 3/1992 | Loper | 455/324 |
| 5,249,203 | 9/1993 | Loper | 375/344 |

Primary Examiner—Temesghen Ghebretinsae
Attorney, Agent, or Firm—M. Mansour Ghomeshi

[57] ABSTRACT

A phase demodulator (101) is used for sensing the phase angle of a phasor represented by the I and Q signals by first producing the analog I and Q signals in a direct conversion receiver (104). A phase generator (106) is used to approximate the angle of the phasor as represented by the I and Q signals by scaling and comparing the magnitudes of the I and Q signals and making decisions based on their relative magnitudes. The scaling includes successive alteration of the magnitude of the I and Q signals depending on their relative magnitudes. A DSP (108) is used to receive this bit stream representation (302) of the phasor and recover the information signal.

8 Claims, 2 Drawing Sheets

MODULATOR WITH BASEBAND TO PHASE CONVERTER

TECHNICAL FIELD

This invention is generally related to phase demodulation in receivers and more particularly with phase demodulation in direct conversion receivers.

BACKGROUND

Direct conversion receivers utilize baseband In-phase (I) and Quadrature (Q) components of a received signal in order to recover transmitted information. The I and Q components may be first converted to digital via Analog to Digital Converters (ADC) and then processed with a Digital Signal Processor (DSP). The recovery of the information signal places a significant burden on the DSP due to the sheer number of instructions needed therefor. Since DSPs are used in radios for a variety of functions, this burden results in the DSP being unable to accomplish its required tasks.

To alleviate this loading problem, designers have used dedicated ICs between the ADCs and the DSP. These ICs include, among other things, look up tables that significantly speed up the recovery process. However, these ICs are too large and too costly. As the size and cost of portable communication devices shrink, a need is felt for an alternative approach in demodulating the phase in a Zero Intermediate Frequency (ZIF) signal without the size and cost burdens of the prior art.

DETAILED DESCRIPTION OF THE PREFERRED EMBODIMENT

Zero Intermediate Frequency (ZIF) receivers use a variety of circuitry's to convert I and Q signals to a phase angle. The phase angle is subsequently utilized in the final recovery of the information signal. Presently available schemes of information recovery either place a significant burden on processors because of the number of instructions and time required for their implementation or utilize dedicated IC's that are expensive and voluminous. The present invention provides a method for converting the I and Q signals into a phase utilizing simple calculations which do not place a significant burden on the processor. In addition, no analog to digital converters are needed in the recovery of the information signal using this scheme. The principles of the present invention will be better understood by referring to a set of drawings beginning with FIG. 1.

Figure 1:
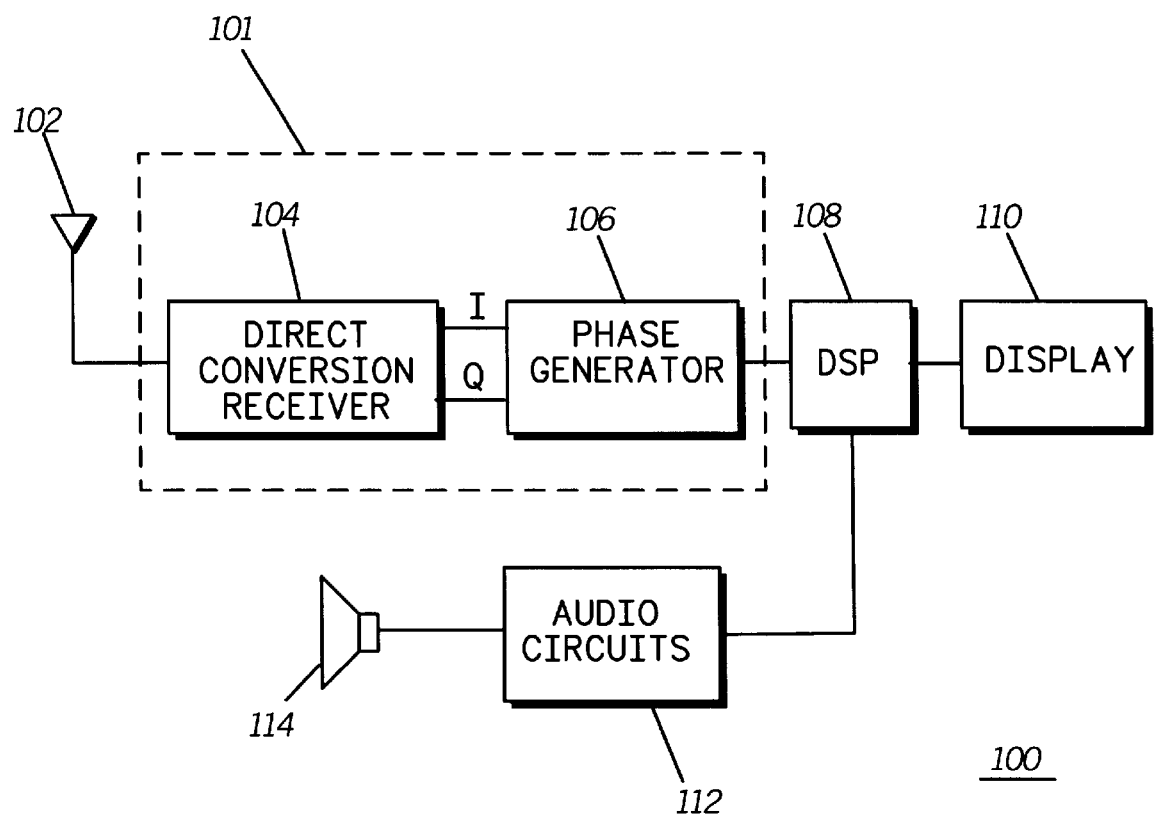
FIG. 1 shows a block diagram of a communication device in accordance with the present invention.

Referring to FIG. 1, a block diagram of a communication device in accordance with the present invention is shown. A received signal, at antenna 102 is applied to a receiver such as a direct conversion receiver 104 where its baseband I and Q components are established. The I and Q signals are then coupled to a phase generator 106. The combination of the receiver 104 and the phase generator 106 form a phase demodulator 101. This phase generator 106 successively manipulates and compares the I and Q signals to each other to establish a phase angle representation of the relationship there between. The operation of the phase generator 106 would be better understood by referring to flow chart 200 of FIG. 2.

Once this phase has been generated it is applied to a Digital Signal Processor (DSP) 108 where it is processed for the recovery of the information. At the DSP 108, the input phase is processed to recover the information signal. Data components of the recovered information are routed to a display terminal 110 for presentation. Audio segments, on the other hand are routed to audio circuits 112 and then heard on a speaker 114.

Figure 2:
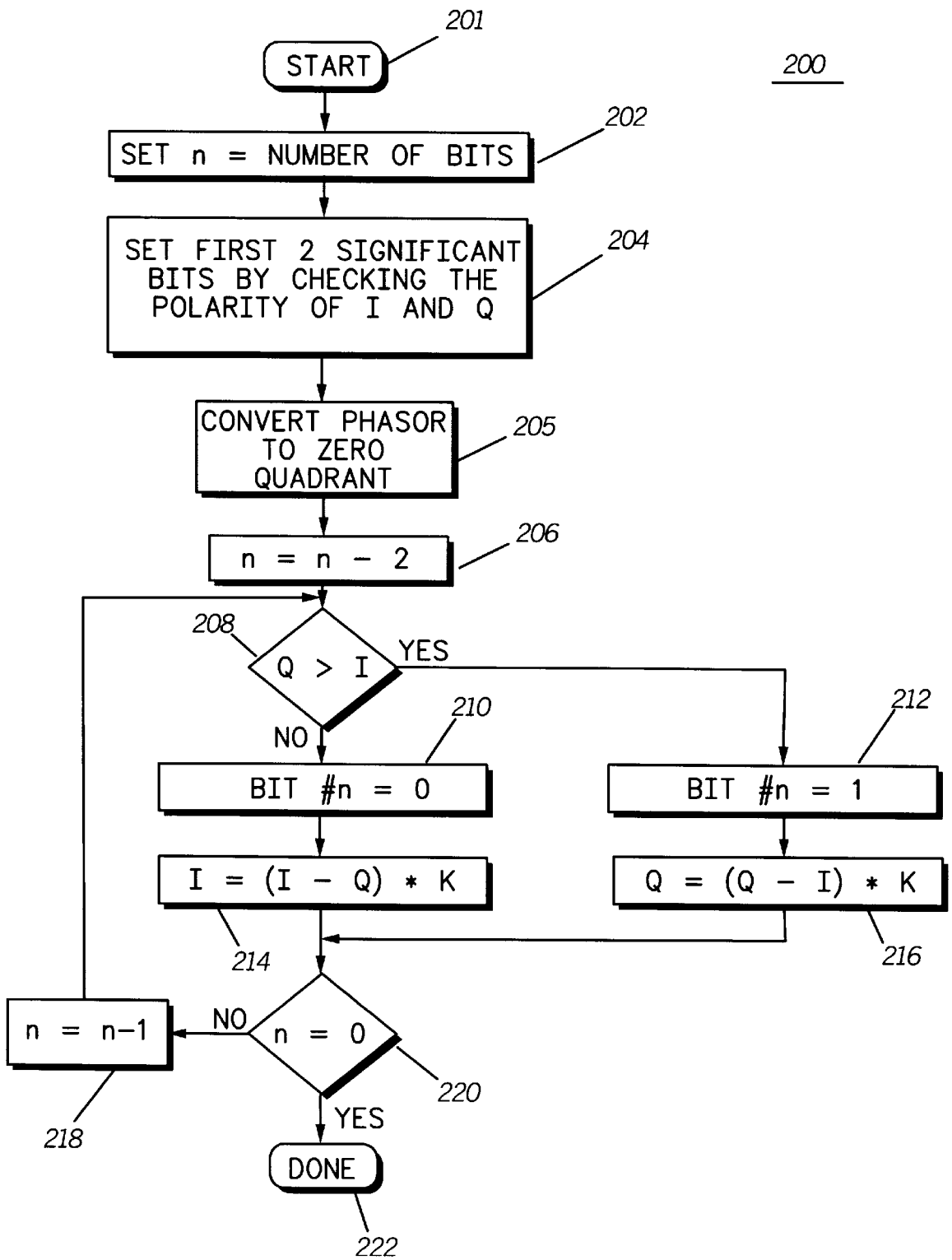
FIG. 2 shows a flow chart of the operation of the communication device in accordance with the present invention.

Referring to FIG. 2, a flow chart of the operation of the phase generator 106 in accordance with the present invention is shown. From a start block 201 an integer number (n) is set via block 202. This integer (n) represents the number of bits used in representing the phasor that is generated at the output of the phase generator 106. In other words, (n) is the resolution of the phase angle. As part of this procedure, an initial determination is made based on the polarities of the I and Q signals via block 204. This block sets the first 2 significant bits of the phase angle by checking the polarity of I and Q. Next, the I and Q signals are converted so that they may appear in the zero quadrant (block 205). This conversion is needed since in the preferred embodiment, the succession step occurs in the zero quadrant. The following table shows the value of the two most significant bits in relation to the polarity of I and Q signals. In addition, this table shows the conversion that the I and Q signals will have to go through in order to appear in the zero quadrant.

| Quadrant No. | I | Q | MSB | MSB −1 | Conversion of phasor to zero quadrant | |
|---|---|---|---|---|---|---|
| 0 | + | + | 0 | 0 | Q = Q | I = I |
| 1 | − | + | 0 | 1 | Q = −I | I = Q |
| 2 | − | − | 1 | 0 | Q = −Q | I = −I |
| 3 | + | − | 1 | 1 | Q = I | I = −Q |

At block 206, the integer (n) representing the required number of bits is deducted by two, reflecting the known value of the two most significant bits. The decision block 208 determines whether the value of Q is greater than that of I. In phase, this is accomplished by establishing a threshold at the 45° point. I is greater than Q when the angle of the signal is lower than this threshold. Conversely, the angle of the signal is higher than the threshold when Q is greater than I. A YES decision results in setting the next bit in the stream of bits representing the phase to "1" via block 212. Block 216 performs a mathematical function in order to manipulate the value of the Q component. In the preferred embodiment, the manipulation includes calculating the difference between the I and Q signals.

Returning back to block 208 a NO decision results in block 210 where the 3rd bit is set to "0". Following this setting of the third bit, the value of I is adjusted to be equal to (I−Q) times a constant (K) in block 214. The constant K used in the calculation of next level I and Q components as shown in blocks 214 and 216 is preferably "0.633." The selection of this constant results in the reduction of distortion to acceptable levels, however other constants may be used. Following block 214 a decision is made to determine whether the value of integer (n) has reached zero. A NO decision is coupled back to the condition block 208 via block 218 where the integer (n) is reduced by "1". This loop is continued until (n) reaches Zero. At that point the YES output of block 220 is realized where a bit stream representing the phase at the output of the phase generator 106 is formulated as shown by block 222. This bit stream is then used to recover the information at the DSP 108 without any complicated calculations.

In summary, the phase demodulator 101 provides a method for sensing the phase angle of a phasor represented by the I and Q components derived from the receiver 104. This phasor is represented via a stream of data formed by comparing and scaling the I and Q signals. The I and Q signals are coupled to the phase generator 106 which produces the phasor. This method includes the generation of the I and Q signals and an approximation of the angle of the phasor as represented by the I and Q signals. This approximation compares the magnitudes of the I and Q signals and makes a decision based on their relative magnitudes. Next, the magnitudes of I and Q signals are successively altered depending on their relative level. The result of this comparison and subsequent scaling is used to set bits in the binary word that represents the phase of the phasor going to the DSP 108. This phase is later used to recover the information carried by the received signals.

What is claimed is:

1. In a phase demodulator, a method for sensing the phase angle of a phasor represented by analog I and Q signals in a phasor diagram comprising the steps of:

producing the analog I and Q signals;

making an initial determination based on the polarities of the I and Q signals;

approximating the angle of the phasor as represented by the I and Q signals by comparing the magnitudes of the I and Q signals and making decisions based on their relative magnitudes;

successively altering the magnitude of the I or Q signal depending on their relative magnitude.

2. The method of claim 1, wherein the step of initial determination includes establishing the first two Most Significant Bits (MSB) of the phasor using the polarities of the I and Q signals.

3. The method of claim 2, wherein the step of initial determination includes converting the phasor to zero quadrant.

4. The method of claim 1, wherein the step of successively altering includes the step of comparing the magnitude of the Q signal with the magnitude of the I.

5. A phase demodulator, comprising:

a Zero Intermediate Frequency (ZIF) generator for producing analog In-Phase (I) and Quadrature (Q) signals; and a phase generator making an initial determination of the I and Q signals based on the polarity of the I and Q signals and further to successively manipulate and compare the I and Q signals to each other to determine the phase angle of a phasor represented by the I and Q signals.

6. The phase demodulator of claim 5, wherein the phase generator includes a Digital Signal Processor (DSP).

7. The phase demodulator of claim 5, wherein the phase generator selectively alters the I and Q signals before comparing them with each other.

8. A communication device, comprising:

a direct conversion receiver for processing a received signal to produce I and Q signals;

a phase generator for making an initial determination of the I and Q signals based on the polarity thereof and for generating a phasor representation of the I and Q signals by successively scaling and comparing the I and Q signals to each other in order to establish a phase representation of the receive signal based on the magnitude of the I and Q signals; and a processor for processing the phase representation to recover the received signal.

* * * * *